United States Patent [19]

Takase

[11] 4,298,700
[45] Nov. 3, 1981

[54] CROSSLINKED BASIC POLYMER AND PREPARATION THEREOF

[75] Inventor: Kunio Takase, Tochigi, Japan

[73] Assignee: Rohm and Haas Company, Philadelphia, Pa.

[21] Appl. No.: 47,182

[22] Filed: Jun. 8, 1979

[51] Int. Cl.³ .................. C08F 8/30; C08F 12/26; B01J 39/20
[52] U.S. Cl. .................. 521/32; 525/375; 525/382; 525/380
[58] Field of Search .................. 521/32; 525/375, 380, 525/382

[56] References Cited

U.S. PATENT DOCUMENTS 2,616,877 11/1952 McMaster .................. 521/32

FOREIGN PATENT DOCUMENTS 48-814 6/1973 Japan .................. 260/568
795379 5/1958 United Kingdom .................. 521/32

OTHER PUBLICATIONS

Chemical Abstracts, vol. 78, 1973, entry 135872s.

*Primary Examiner*—John Kight, III
*Assistant Examiner*—Peter F. Kulkosky

[57] ABSTRACT

Crosslinked basic polymers useful as weak base ion exchange resins are prepared by reaction, in the presence of an alkali, of a crosslinked aromatic polymer matrix which contains haloalkyl groups, with an oxy compound selected from:

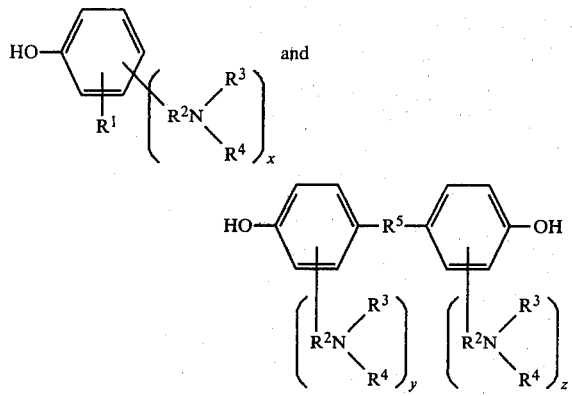

to provide a polymer predominating in repeating units of the formula:

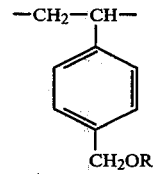

where R is the residue of said oxy compound, x, y and z are integers of from 1 to 3, $R^1$, $R^3$, and $R^4$ independently are hydrogen or alkyl, and $R^2$ and $R^5$ are each alkylene.

11 Claims, No Drawings

CROSSLINKED BASIC POLYMER AND PREPARATION THEREOF

This invention relates to crosslinked basic polymers useful for various industrial applications such as ion exchange, and to a method for the manufacture thereof. More particularly, this invention relates to basic polymers based on a crosslinked vinyl aromatic polymer matrix containing haloalkyl groups. In the method of the invention, the haloalkyl groups are reacted, in the presence of an alkaline reagent, with amino-substituted oxy compounds to provide the basic polymers of the invention.

The crosslinked vinyl aromatic polymers used to produce the basic polymers of the invention comprise haloalkyl group-containing copolymers of aromatic monovinyl hydrocarbons and aromatic polyvinyl hydrocarbons (crosslinkers), wherein the haloalkyl groups are incorporated by halogenating the crosslinked copolymers with chlorine or a mixture of an aldehyde and a halogen acid (as described in U.S. Pat. Nos. 2,632,001 and 2,591,573), by halomethylating the crosslinked copolymers as with chloromethyl methyl ether (U.S. Pat. No. 2,614,099), or by including with or in place of the aromatic monovinyl hydrocarbons a haloalkyl monovinyl monomer such as vinylbenzyl chloride (U.S. Pat. Nos. 3,843,566, 3,991,017). All of these classes of crosslinked haloalkyl group containing aromatic polymer matrices are well known. As is evident from the last cited patents and Canadian Pat. No. 932,126, the crosslinked polymer matrix may be in the form of a gel or macroreticular beads or may be a porous mass depending on the polymerization method. For example, solution, emulsion or bulk polymerization will normally provide a porous mass or droplets which can be suitably dried and ground up to provide a particulate material. Preferably, suspension polymerization is employed, resulting in spherical particles or beads. The latter is the preferred form for many industrial applications such as catalysis and columnar separations. Accordingly, the selection of crosslinked haloalkyl group containing starting polymers and preparation thereof is not critical and can be varied within wide limits as known to those skilled in the art.

Representative of specific crosslinked polymer matrices usable as starting materials in the invention are those obtained by copolymerizing styrene with crosslinking monomers such as aromatic polyvinyl monomers like divinyl benzene, divinyl toluene and divinyl naphthalene, or aliphatic polyvinyl monomers like diacrylic ethylene glycol esters, dimethacrylic ethylene glycol esters and divinyl adipate, and then chloromethylating the copolymers with chloromethyl methyl ether or with a mixture of hydrochloric acid, methanol and formalin.

The amount of the crosslinking monomer relative to the total amount of the monomer mixture can be freely varied, e.g., from about 0.1 to about 80% by weight of the monovinyl monomers. However, since the total potential capacity of the polymer products when used as anion exchange resins decreases with an increase in the amount of crosslinking agent, an amount of about 0.5 to about 30%, preferably about 2–15%, is recommended when ion exchange is contemplated.

The crosslinked polymer matrix is then reacted, in the presence of an alkaline reagent, with an amino-substituted oxy compound selected from

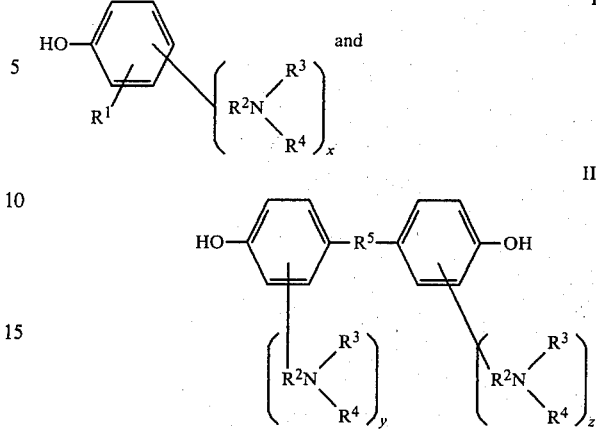

wherein x, y and z are integers of from 1 to 3, $R^1$, $R^3$ and $R^4$ independently are hydrogen or alkyl, and $R^2$ and $R^5$ are each alkylene.

Typical of oxy compounds of the formulas I and II are the following compounds wherein alkyl and the alkylene radicals $R^2$ and $R^5$ may contain 1 to about 8 carbon atoms, preferably 1 to 4 carbon atoms:

dialkylaminoalkylphenols, di(dialkylaminoalkyl)-phenols, tri(dialkylaminoalkyl)phenols, dialkylaminoalkylcresols, di(dialkylaminoalkyl)cresols, tri(dialkylaminoalkyl)-cresols, 2,2-bis-dialkylaminoalkyl-4-oxyphenyl-propanes, 2,2-bis-dialkylaminoalkyl-4-oxyphenyl-butanes, 2,2-bis-di(dialkylaminoalkyl)-4-oxyphenyl-propanes, and 2,4-bis-di(dialkylaminoalkyl)-4-oxyphenyl-isopropanes.

The oxy compounds of formulae I and II are known compounds as described, for example, in Japanese patent publication No. 48-814, together with methods of synthesis.

The alkaline reagent useable for the present invention may be any of the many types known to be effective for base-catalyzed reactions. Examples are alkali metals such as sodium and potassium, alkali alcoholates such as sodium ethalate, and alkali metal hydroxides such as sodium or potassium hydroxide. Desirably, the reaction with oxy compound I or II is carried out in any solvent suitable for base-catalyzed reactions, such as a polar solvent. Examples of suitable solvents include alcohols such as methanol, ethanol and propanol; amides such as dimethyl acetamide and dimethylformamide; dimethylsulfoxide; and others, including admixtures thereof.

The oxy compound I or II and the crosslinked vinyl aromatic polymer matrix are reacted in at least a 1:1 molar ratio, preferably a molar ratio of at least 1.5:1, in order to obtain a good yield of the basic polymer product. The alkaline reagent should be used in at least a 1:1 molar ratio with respect to the oxy compound I or II. The reaction preferably is carried out at atmospheric pressure but a wide range of pressures may be employed with suitable adjustment of reaction time and temperature in order to provide the best results in terms of reaction control and yield. At atmospheric pressure, suitable reaction temperatures may range from about 20° C. to about 100° C., preferably about 75° C. to about 95° C., for a period of from about 10 to about 20 hours.

The crosslinked basic polymers of the invention will predominate in repeating units of the formula

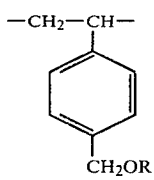

wherein R is

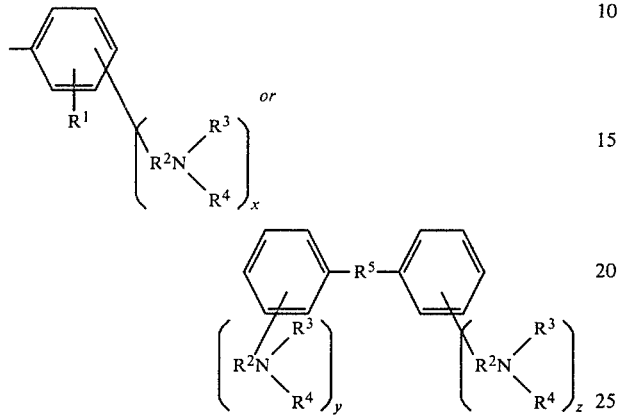

and where x, y and z and $R^1$, $R^2$, $R^3$, $R^4$ and $R^5$ are as defined above with respect to compounds I and II.

In the case of use of a crosslinked polymer matrix based solely on vinyl aromatic polymers crosslinked with polyvinyl compounds, the products of the invention will have the structure:

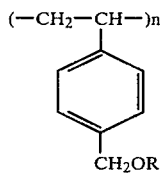

wherein R is as defined above and n is the number of repeating units in the polymer.

The crosslinked basic polymers of the invention can be used in a known manner for a variety of industrial applications, and particularly as weakly basic anion exchange resins, for example, for purifications, separations, recovery of valuable ionic constituents, replacements of deleterious ions with innocous ions, fractionations, deionization, and the like. Furthermore, the basic polymers of the invention can be readily converted into strongly basic anion exchange resins by quaternization in a known manner, for example, by reaction with an alkyl halide such as methyl chloride.

The invention will be more particularly described with reference to the following examples.

EXAMPLE 1

At room temperature, 31.0 g of an MR (macroreticular) type vinylbenzyl chloride-divinyl benzene copolymer (divinyl benzene crosslinker content, 7%), and a mixture consisting of 250 ml. of dimethyl acetamide, 79.5 g. of 2,4,6-tri-dimethylaminomethyl phenol and 16.5 g. of sodium methalate, were admixed and held for 30 minutes. Thereafter, the mixture was stirred at 80° C. for 20 hours. After the mixture was cooled, the liquid portion thereof was removed by siphon and the remaining solid portion was washed with water several times, treated with 4% HCl and 5% NaOH, washed and neutralized. The amount of the crosslinked polymer product was 95 ml. and the water content was 41.0%. The infrared spectrum of this product indicated incorporation of the 2,4,6-tri-dimethylaminomethyl phenol.

EXAMPLE 2

Essentially as described in Example 1, 31.0 g. of the same crosslinked copolymer and a mixture consisting of 375 ml. of dimethyl acetamide, 136.0 g. of 2,2-bis-3,5-dimethylaminomethyl-4-oxyphenylpropane and 16.5 g. of sodium methylate, were admixed and held at room temperature for 30 minutes. Thereafter, the mixture was stirred for 95° C. for 18 hours. From this point onward, it was subjected to the same treatment as that of Example 1. The amount of polymer product obtained was 115 ml. and the water content was 45.0%. The infrared spectrum of the product again indicated good incorporation of the oxyphenyl propane.

EXAMPLE 3

At room temperature, 12.4 g. of a gel-type chloromethylated styrene-divinyl benzene copolymer (divinyl benzene crosslinker content, 4%) and a mixture consisting of 100 ml. of dimethyl acetamide, 28.0 g. of 2,4,6-tridimethylaminomethyl phenol and 5.8 g. of sodium methylate, were admixed and held for 30 minutes. Thereafter, the mixture was stirred at 90° C. for 15 hours and then cooled. The liquid portion of the mixture was removed by siphon and the solid portion was washed with water several times and thereafter treated similarly to Example 1. The amount of the copolymer produced was 19 ml. and the water content thereof was 27%. The infrared spectrum thereof was similar to that of the product of Example 1.

EXAMPLE 3

The basic polymers obtained in Examples 1–3 were tested in a conventional way for weakly basic exchange capacity. The results were as shown in the following table.

| Polymer Ex. | Weakly basic exchange capacity (meq./g. dry) |
|---|---|
| 1 | 4.4 |
| 2 | 4.2 |
| 3 | 3.5 |

EXAMPLE 5

The polymers obtained in Examples 1–3 were each packed to a wet volume of 15 ml. in a column and converted into hydrochlorides by passage therethrough of 5% HCl. A 20-bed volume of a solution containing 1.80 g. of iron II and 4.24 g. of copper II per liter and having a pH value of 1.5 was passed through the polymers at a flow rate of 2 ml./min. The polymers were then washed with water and eluted with an aqueous 1 N $H_2SO_4$ solution. They were subsequently tested for metal content by atomic adsorption analysis, with the following results:

| | Ion Concentration in Elute | |
|---|---|---|
| Polymer Ex. | $Fe^{3+}$ (meq./e Resin dry) | $Cu^{2+}$ (meq./e Resin dry) |
| 1 | 137 | 0.5 |

-continued

| | Ion Concentration in Elute | |
|---|---|---|
| | $Fe^{3+}$ | $Cu^{2+}$ |
| Polymer Ex. | (meq./e Resin dry) | (meq./e Resin dry) |
| 2 | 116 | 0.4 |
| 3 | 109 | 0.4 |

I claim:

1. A crosslinked basic polymer predominating in repeating units of the formula:

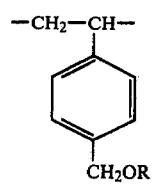

wherein R is 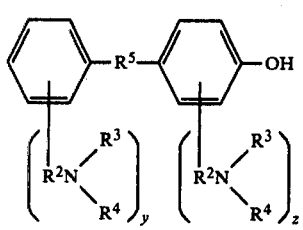 or

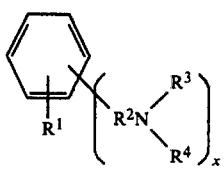

wherein x, y and z are integers of from 1 to 3, $R^1$, $R^3$ and $R^4$ independently are hydrogen or alkyl, and $R^2$ and $R^5$ are each alkylene.

2. The basic polymers of claim 1 wherein R is

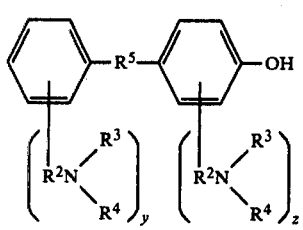

3. The basic polymer of claim 1 wherein R is

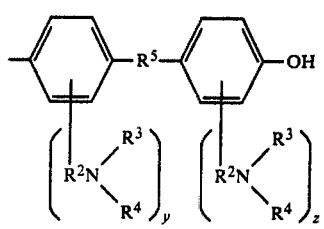

4. The basic polymer of claims 1 or 2 wherein x is 1, $R^1$ is hydrogen, and each of $R^2$, $R^3$ and $R^4$ is alkyl($C_1$-$C_4$).

5. The basic polymer of claims 1 or 3 wherein x, y and z are each 1, and each of $R^2$, $R^3$, $R^4$ and $R^5$ is alkyl($C_1$-$C_4$).

6. A method of preparing a basic polymer which comprises reacting, in the presence of an alkali, a crosslinked aromatic polymer matrix containing haloalkyl groups with an oxy compound selected from

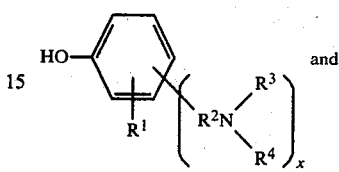 and

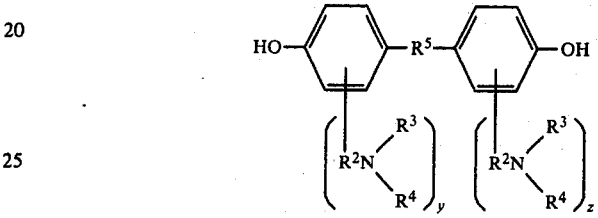

wherein x, y and z are integers of from 1 to 3, $R^1$, $R^3$ and $R^4$ independently are hydrogen or alkyl, and $R^2$ and $R^5$ are each alkylene.

7. A method as in claim 6 wherein the oxy compound is

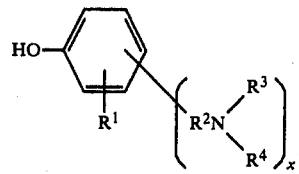

8. A method as in claim 6 wherein the oxy compound is

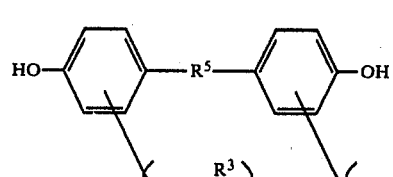

9. A method as in claims 6 or 7 wherein x is 1, $R^1$ is hydrogen, and each of $R^2$, $R^3$ and $R^4$ is alkyl($C_1$-$C_4$).

10. A method as in claims 6 or 8 wherein x, y and z are each 1, and each of $R^2$, $R^3$, $R^4$ and $R^5$ is alkyl($C_1$-$C_4$).

11. A method as in claim 6 wherein the molar ratio of cross-linked aromatic polymer matrix containing haloalkyl groups to oxy compound is at least 1:1, and the molar ratio of alkali to oxy compound is at least 1:1.

* * * * *